Sept. 8, 1959  J. R. ANDERSEN  2,902,879
ANTI-BACKLASH GEAR ASSEMBLY
Filed Oct. 3, 1958
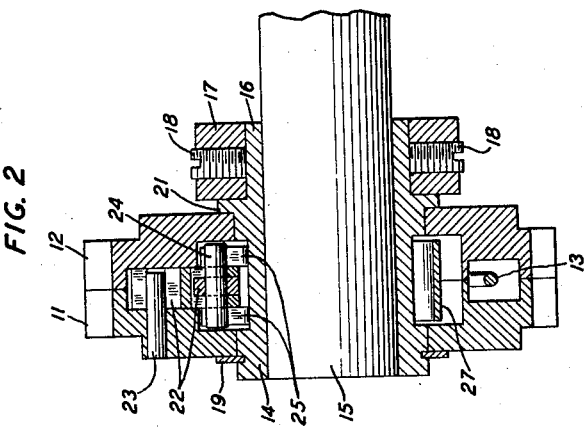
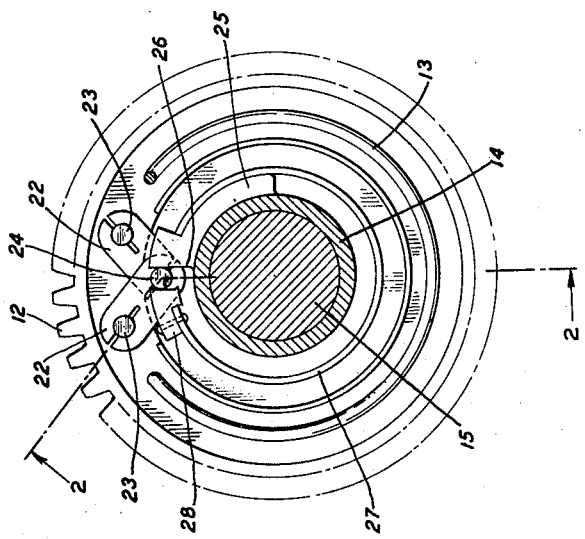
INVENTOR
J. R. ANDERSEN
BY
Walter M. Hill
ATTORNEY

United States Patent Office 2,902,879
Patented Sept. 8, 1959

2,902,879

ANTI-BACKLASH GEAR ASSEMBLY

Johan R. Andersen, Bloomingdale, N.J., assignor to Bell Telephone Laboratories, Incorporated, New York, N.Y., a corporation of New York Application October 3, 1958, Serial No. 765,259

5 Claims. (Cl. 74—440)

This invention relates to gearing assemblies, and more particularly to those of the anti-backlash type.

In data transmission gear trains the accurate reproduction of mechanical signals is of the utmost importance. To accomplish this, the reduction of backlash is essential. An increase in backlash is noted when wear or corrosion of the gear teeth occurs or when there is an increase in the distance between the centers of the driving or "bull" gear and the pinion gear. Because dissimilar metals are frequently used in gears, shafts and housings, any change in ambient temperature conditions results in a differential expansion or contraction of parts, and this, in turn, causes a change in center distance.

The anti-backlash gearing used heretofore employs a fixed gear secured to the shaft to be rotated and a coaxial movable gear. These gears are spring biased in opposite rotational directions so as to form a clamping action against the teeth of the gear intermeshed therewith. This design is simple but it possesses inherent angular inaccuracies which can become excessive when the aforementioned center distance is changed as a result of variations in ambient temperature. For example, with an increase in center distance the fixed and movable gears are rotated in opposite directions, under the spring biasing force, so as to remain in contact with the tooth flanks of the mating gear. Such a rotation of the fixed gear, however, produces a relative rotation of the shaft secured thereto and this rotation, of course, constitutes an error. Wear and corrosion of the gear teeth will also produce such an error, except generally to a lesser degree.

It is accordingly the object of this invention to reduce angular transmission errors in high accuracy gearing systems resulting from variations in gear backlash.

It is a further object of this invention to reduce the errors induced in high accuracy gearing systems by wear and corrosion or changes in center distance.

These objects are attained in accordance with the present invention wherein a pair of pinion gears are rotatably or "floatingly" mounted on a shaft and a coil spring is connected to the gears at respective ends thereof. The spring, being tensioned, forces the gears equally in opposite rotational directions thus forming a clamping action against the teeth of the driving gear intermeshed therewith. A V-shaped linkage mechanism interconnects the pair of pinion gears, while the vertex thereof is urged in sliding engagement with a flat surface made integral with said shaft. A change in center distance produces equal and opposite rotations of the two floating gears relative to said shaft, but this merely moves the vertex of the mechanism in a plane parallel to said surface and hence no rotational movement is imparted to the shaft. However, the rotational movement of said pinion gears in the same direction, in response to rotational movement of the driving gear, effects a movement of said vertex laterally of said plane which is transmitted to the shaft to cause a corresponding movement thereof.

The advantages and features of the invention will become more apparent from the following detailed description which, together with the accompanying drawing, discloses a preferred embodiment.

In the drawing:

Fig. 1 is a side elevation view of the anti-backlash gearing assembly with one of the gears removed to show the internal structure thereof; and Fig. 2 is a cross-section view of the assembly taken on the line 2—2 of Fig. 1.

Referring to Figs. 1 and 2, there is shown therein a pair of pinion gears 11 and 12 and a coil spring 13 interconnected to the gears at respective ends thereof (the gear 11 has been omitted in Fig. 1 to provide a view of the linkage mechanism). The spring, when tensioned, forces the gears equally in opposite rotational directions thus forming a clamping action against the teeth of the driving gear (not shown) intermeshed therewith.

The gears are rotatably or "floatingly" mounted on a hub 14 having a central shaft opening therein adapted to receive a shaft 15. The hub 14 is provided with a longitudinal extension 16 which is split, longitudinally, to render it somewhat flexible. A sleeve or collar 17 fits over this extended portion of the hub and the set screws 18 when tightened secure the hub to the shaft. The retaining ring 19 when snapped in position retains the gears 11 and 12 between it and the shoulder 21 of the hub. Thus, the gears are fixedly positioned along the length of the shaft but are freely rotatable thereabout.

A pair of links 22, of the same length, are each respectively connected at one end thereof to one of the pinion gears by means of pins 23. These links are also interconnected at their opposite free ends to each other, by means of pin 24, to thereby form a V-shaped linkage. To eliminate undesirable play in the linkage, the links are slotted or slit adjacent the ends so that when fitted with the pins the latter are engaged under slight tension.

Since the pin 24 lies at the intersection of the links 22, it can be considered as constituting the vertex of the linkage mechanism. As shown in Fig. 1, the radial center line from the shaft axis through the axis of pin 24 bisects the V angle. Accordingly, if the gears 11 and 12 are moved equally in opposite rotational directions, the pin 24 will move in a path perpendicular to said shaft along said radial center line.

The hub 14 is provided with an integral, outwardly extending portion 25 which is bifurcated in the region most adjacent the V-shaped linkage, as shown in Fig. 2. The said portion 25 is terminated at the end adjacent the linkage in a flat surface 26 which is ground parallel to the aforementioned radial center line. The distance between the radial center line and the surface 26 is equal to the radius of the pin 24.

A flat bow spring 27 is secured at one end to the integral portion 25 of the hub while the free end has a bearing block 28 mounted thereon. The bow spring 27 acts through the block 28 to maintain the pin 24 in contact with surface 26.

Considering the operation of this linkage mechanism, let it be assumed that a change in center distance occurs between the driving gear shaft and the pinion gear shaft. Such a change will result in a greater or lesser degree of engagement between the teeth of the intermeshed gears. If the center distance increases, for example, the spring 13 moves the gears 11 and 12 in opposite rotational directions to take up the backlash. With a decrease in center distance, the gears 11 and 12 are moved in opposite rotational directions by the force acting through the tooth flanks of the mating gear. Movement of gears 11 and 12 in equal opposite rotational directions results in the pin 24 being moved, slightly, in a path perpendicular to the shaft axis and parallel to the flat surface 26. This, however, imparts no rotational movement to the shaft.

The rotational movement of said pinion gears in the same direction, in response to rotational movement of the driving gear, effects a lateral or rotational movement of said vertex which is transmitted to the shaft to cause a corresponding movement thereof. For example, if the gears 11 and 12 are force to move in a clockwise direction, this movement will be transmitted through the links 22 to cause the vertex or pin 24 to move laterally with respect to the perpendicular path or plane in which it initially lay. The pin 24 is thus urged against surface 26 to effect a corresponding movement of the latter and of shaft 15. For a counterclockwise rotation of the gears, the pin 24 is urged against block 28 and this force is transmitted through bow spring 27 to rotate the integral portion 25, hub 14 and shaft 15.

The surfaces between all moving parts, and in particular those of pin 24 and surface 26, should have a fine smooth finish in order to reduce frictional resistance and eliminate "sticking."

While the gears 11 and 12 have been designated pinion gears and the shaft 15 as the "driven" shaft, it will be clear to those in the art that the invention is not so restricted, namely, the shaft 15 could if desired be the driving shaft.

It is understood, therefore, that the foregoing disclosure relates to only a preferred embodiment of the invention and that numerous modifications or alterations may be made therein without departing from the spirit and scope of the invention.

What is claimed is:

1. An anti-backlash gearing device comprising a pair of gears adapted to be rotatably mounted on a shaft, a spring connected to each of said gears for normally urging said gears in opposite rotational directions when the same are intermeshed with a third gear, and linkage means connected to each of said pair of gears for transmitting to said shaft only those rotary movements of said pair of gears which occur in the same direction.

2. An anti-backlash gearing device comprising a pair of gears adapted to be rotatably mounted on a shaft, a spring connected to each of said gears for normally urging said gears in opposite rotational directions when the same are intermeshed with a third gear, a V-shaped linkage mechanism interconnecting said pair of gears, the vertex of said linkage mechanism being moved in a direction perpendicular to said shaft when said pair of gears are moved equally in opposite rotational directions, and means in contact with said vertex and adapted to be secured to said shaft for conveying to said shaft lateral movements of said vertex.

3. An anti-backlash gearing device comprising a pair of gears adapted to be rotatably mounted on a shaft, a spring connected to each of said gears for normally urging said gears in opposite rotational directions when the same are intermeshed with a third gear, a pair of links each respectively connected at one end thereof to one of said pair of gears and connected at the opposite ends to each other to form a V-shaped linkage, and means adapted to be secured with respect to said shaft for maintaining the vertex of said linkage in contact with a surface likewise secured with respect to said shaft, said vertex being urged against said surface or said means when said pair of gears are moved in the same rotational direction and being moved in a direction parallel to said surface when said pair of gears are moved equally in opposite rotational directions, whereby a rotational movement is imparted to said shaft only when said pair of gears are moved in the same rotational direction.

4. An anti-backlash gearing device comprising a pair of gears rotatably mounted on a shaft, a spring connected to each of said gears for normally urging said gears in opposite rotational directions when the same are intermeshed with a third gear, a pair of links each respectively connected at one end thereof to one of said pair of gears and connected at the opposite ends to each other to form a V-shaped linkage, the V angle of said linkage being bisected by the radial line of said shaft which passes through the vertex of said linkage, a flat outwardly extending surface parallel to said radial line and fixedly secured with respect to said shaft, and resilient means secured with respect to said shaft for maintaining the vertex of said linkage in sliding contact with said surface.

5. An anti-backlash gearing device comprising a hub having a central shaft opening therein adapted to receive a shaft, a pair of gears rotatably mounted on said hub, a spring connected to each of said gears for normally urging said gears in opposite rotational directions when the same are intermeshed with a third gear, a V-shaped linkage mechanism interconnecting said pair of gears, the vertex of said linkage mechanism being moved in a direction perpendicular to the axis of said hub when said pair of gears are moved equally in opposite rotational directions, and means integral with said hub and in contact with said vertex for conveying to said hub lateral movements of said vertex.

No references cited.